United States Patent
Rozen et al.

(10) Patent No.: US 11,735,164 B2
(45) Date of Patent: *Aug. 22, 2023

(54) METHOD AND SYSTEM OF AUTOMATIC SPEECH RECOGNITION WITH HIGHLY EFFICIENT DECODING

(71) Applicant: Intel Corporation, Santa Clara, CA (US)

(72) Inventors: Piotr Rozen, Gdansk (PL); Joachim Hofer, Munich (DE)

(73) Assignee: Intel Corporation, Santa Clara, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 17/397,780

(22) Filed: Aug. 9, 2021

(65) Prior Publication Data

US 2021/0366464 A1 Nov. 25, 2021

Related U.S. Application Data

(63) Continuation of application No. 16/832,410, filed on Mar. 27, 2020, now Pat. No. 11,120,786.

(51) Int. Cl.
| | | |
|---|---|---|
| *G10L 15/08* | (2006.01) | |
| *G10L 15/02* | (2006.01) | |
| *G10L 15/06* | (2013.01) | |
| *G10L 15/04* | (2013.01) | |
| *G06F 40/20* | (2020.01) | |
| *G10L 19/00* | (2013.01) | |

(52) U.S. Cl.
CPC .............. *G10L 15/04* (2013.01); *G06F 40/20* (2020.01); *G10L 19/00* (2013.01)

(58) Field of Classification Search
CPC ......... G10L 15/02; G10L 15/06; G10L 15/08; G10L 15/28
See application file for complete search history.

(56) References Cited

U.S. PATENT DOCUMENTS

| | | | |
|---|---|---|---|
| 9,865,254 B1 * | 1/2018 | Filimonov | .............. G10L 15/02 |
| 10,199,037 B1 * | 2/2019 | Filimonov | .............. G10L 15/08 |
| 10,409,552 B1 * | 9/2019 | Jara | .......................... G10L 15/22 |
| 2004/0158468 A1 | 8/2004 | Baker | |
| 2006/0136207 A1 * | 6/2006 | Kim | ......................... G10L 15/08 |
| | | | 704/E15.014 |
| 2009/0018836 A1 * | 1/2009 | Morita | ..................... G10L 13/07 |
| | | | 704/260 |
| 2010/0198597 A1 | 8/2010 | Zhu | |
| 2014/0180690 A1 | 6/2014 | Fastow et al. | |

(Continued)

FOREIGN PATENT DOCUMENTS

| | | | | |
|---|---|---|---|---|
| CN | 105845128 A * | 8/2016 | ............. | G10L 15/02 |
| JP | 4042176 B2 * | 2/2008 | | |

OTHER PUBLICATIONS

Extended European Search Report for European Patent Application No. 20216176.6, dated Jun. 1, 2021.

(Continued)

*Primary Examiner* — Shreyans A Patel
(74) *Attorney, Agent, or Firm* — Essential Patents Group, LLP

(57) ABSTRACT

A system, article, and method of automatic speech recognition with highly efficient decoding is accomplished by frequent beam width adjustment.

25 Claims, 9 Drawing Sheets

(56) References Cited

U.S. PATENT DOCUMENTS

2016/0210115 A1* 7/2016 Lee .................. G06F 3/167
2020/0227024 A1* 7/2020 Rozen ............... G10L 15/08

OTHER PUBLICATIONS

Notice of Allowance for U.S. Appl. No. 16/832,410, dated May 26, 2021.
Fabian, T. et al., "Comparing confidence-guided and adaptive dynamic pruning techniques for speech recognition", 14$^{th}$ European Signal Processing Conference (EUSIPCO 2006), Florence, Italy, Sep. 4, 2006.

* cited by examiner

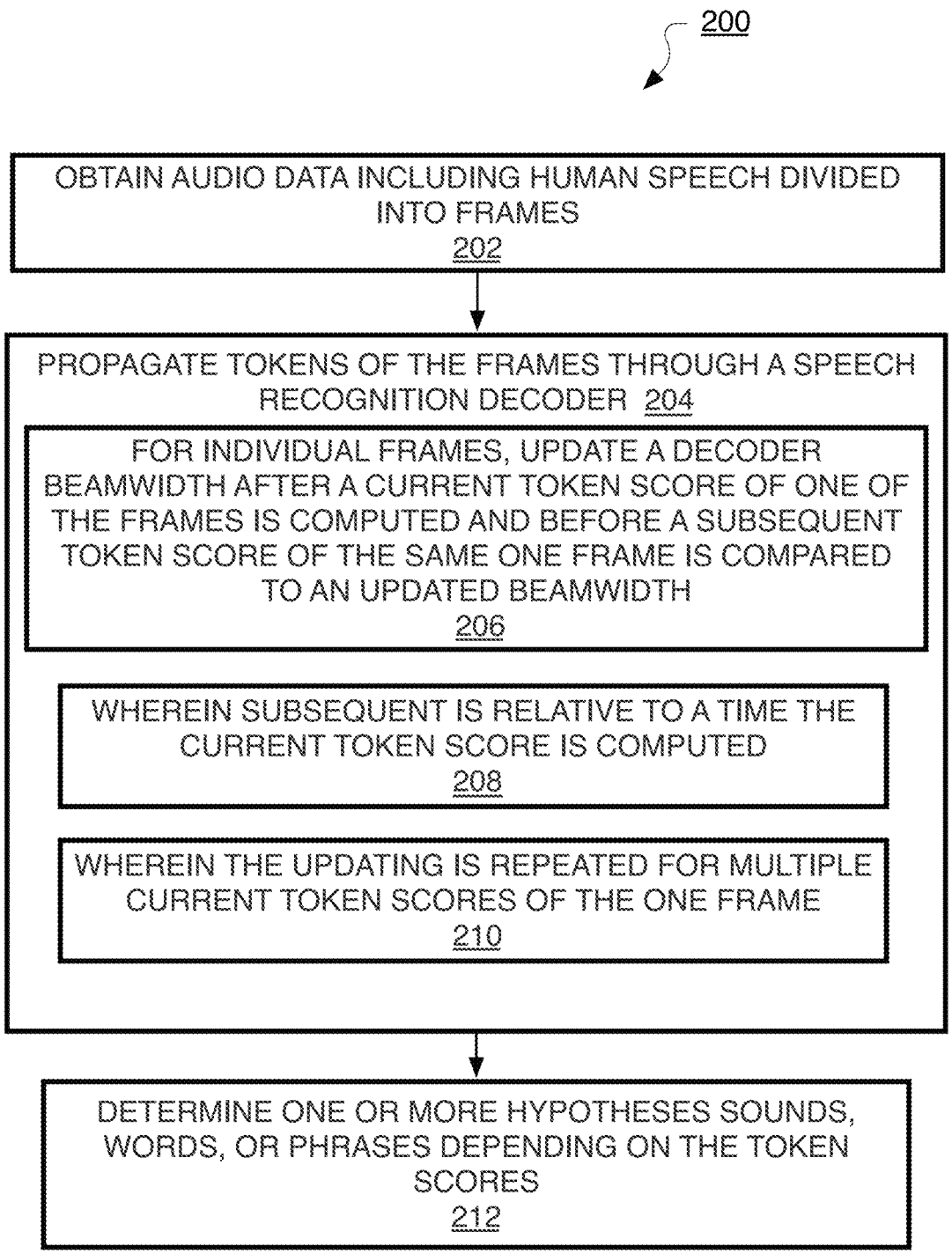

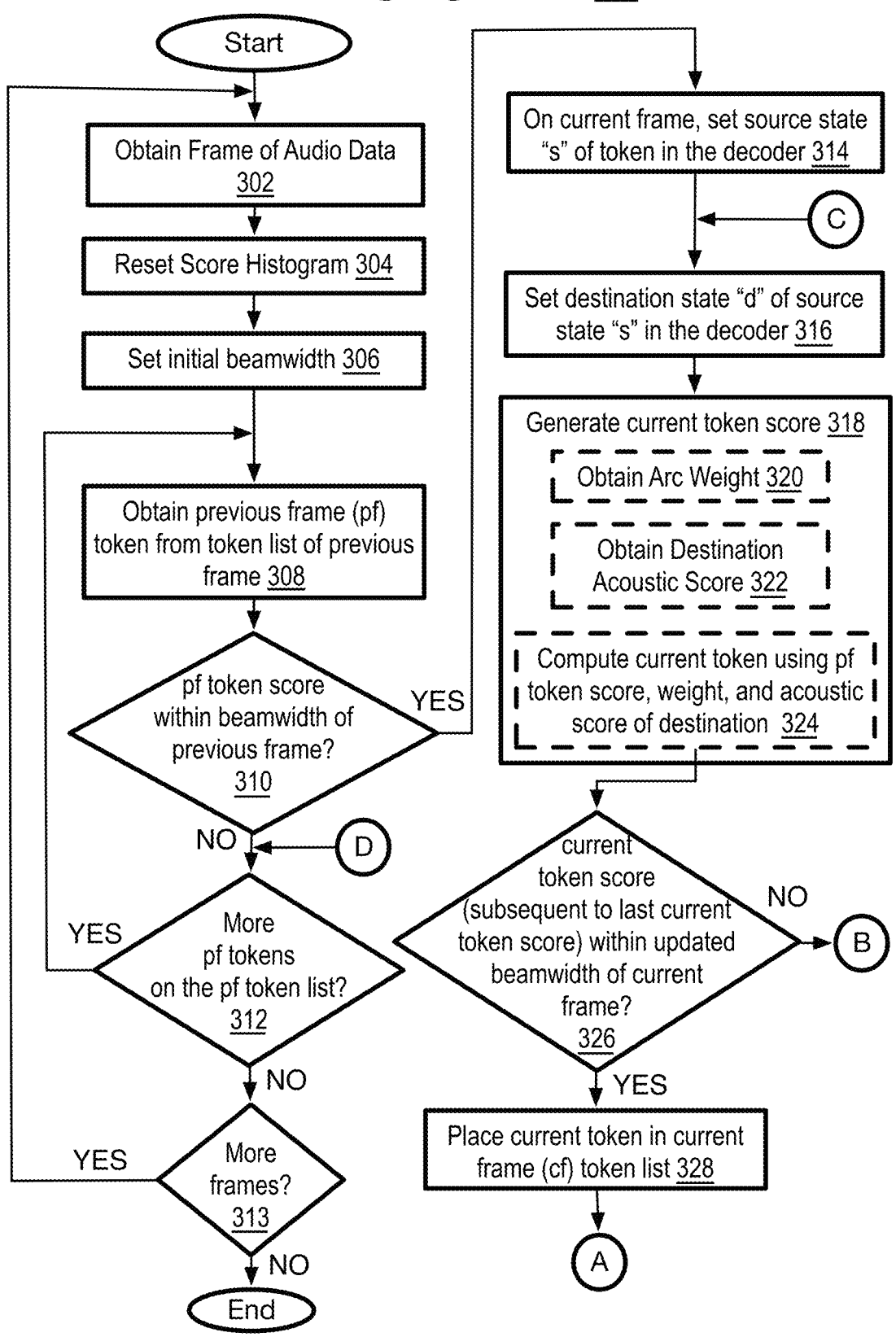

METHOD AND SYSTEM OF AUTOMATIC SPEECH RECOGNITION WITH HIGHLY EFFICIENT DECODING

CROSS-REFERENCE TO RELATED PATENT APPLICATIONS

This application is a continuation of pending U.S. patent application Ser. No. 16/832,410, filed Mar. 27, 2020, and which is incorporated herein for all purposes.

BACKGROUND

Speech recognition systems, or automatic speech recognizers, have become increasingly important as more and more computer-based devices use speech recognition to receive commands from a user in order to perform some action as well as to convert speech into text for dictation applications or even hold conversations with a user where information is exchanged in one or both directions. Thus, automatic speech recognition (ASR) is desirable for wearables, smartphones, and other small devices as well as any other computer or device that requires audio recognition.

Some of these ASR systems are large vocabulary systems, such as for personal assistants on smart phones or other mobile devices as well as some computers. These large vocabulary ASR systems have relatively large computational loads. Due to the large computational loads as well as complexity of ASR, however, it is very difficult to operate these systems in real time, especially when a large vocabulary ASR system is embedded or on-board (or local) on the mobile device. Often, such on-board ASR systems for small devices have on-board computation ability that is too slow, relatively lower quality word recognition, and/or higher power consumption such that the ASR is not practical. The large vocabulary ASR systems also require relatively large amounts of processors, other accompanying hardware, and reduce battery life. This is true for larger systems such as laptops in addition to small mobile devices. Thus, a good quality ASR system that provides sufficiently accurate word recognition in real time while using lower power consumption and reduced hardware requirements is desired.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 2 is a flow chart of an automatic speech recognition process with highly efficient decoding according to at least one of the implementations herein;

FIGS. 3A-3B is a detailed flow chart of an automatic speech recognition process with highly efficient decoding according to at least one of the implementations herein;

DETAILED DESCRIPTION

Figure 1:
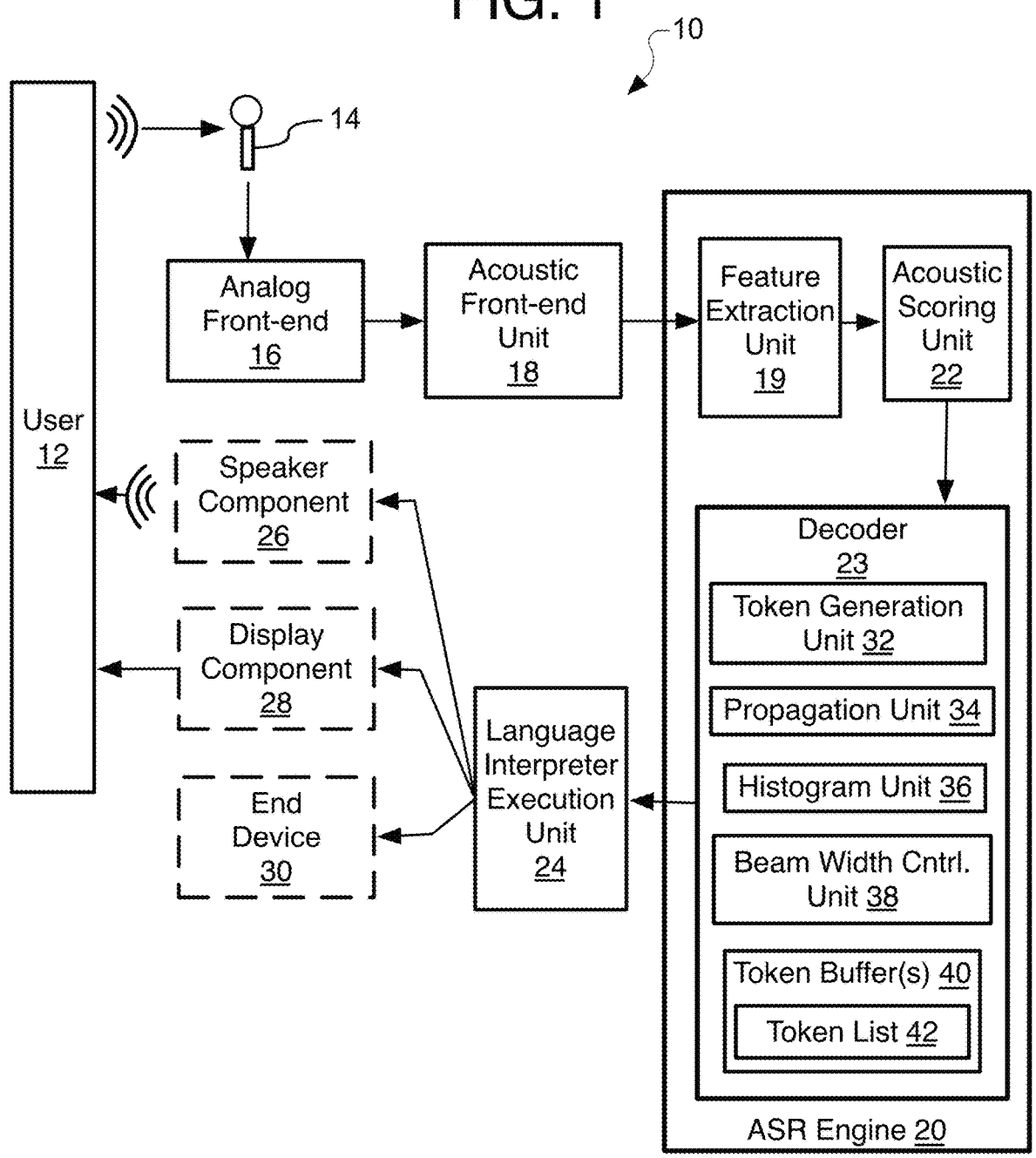
FIG. 1 is a schematic diagram showing an automatic speech recognition (ASR) system according to at least one of the implementations herein.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as mobile devices including smartphones, smart speakers, and wearable devices such as smartwatches, smart-wrist bands, smart headsets, and smart glasses, but also laptop or desk top computers, video game panels or consoles, television set top boxes, dictation machines, vehicle or environmental control systems, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of automatic speech recognition with highly efficient decoding.

Small computer devices often use a personal assistant application to perform automatic speech recognition (ASR) to receive and recognize audio commands or requests for information. By some examples, the personal assistants may perform a certain task such as look up contact information, place a phone call, find directions to a location, or search for keywords on the internet to name a few examples. Such an ASR application, as well as many other such ASR applications, use a large vocabulary which results in a computationally demanding, communication heavy, and data intensive workload where the large computational load needs a relatively large amount of processors and consumes a large amount of energy (or battery power). When mobile devices support embedded, stand-alone large vocabulary ASR capability without the help from remote tethered devices and without large battery capacities, battery life extension is especially desirable. This is true for larger computers, such as laptops as well.

Specifically, ASR typically involves extracting audio features from a captured audio signal by transforming windows, or frames, of the audio into feature vectors by using an acoustic frontend. Then, acoustic scores are generated for phonetic units formed of those features, and the acoustic scores are provided to a decoder such as a weighted finite state transducer (WFST) to generate hypotheses of the most likely utterances. A language interpretation unit then determines which of the hypotheses is the correct spoken language.

Difficulties arise, however, when attempting to run ASR in real time on a battery operated device. When ASR is operating in real-time on an embedded device, the decoder uses a very large amount of compute. A conventional WFST decoder uses statistical language models and Viterbi search algorithms to pass tokens through states or nodes on the decoder. In every time frame, e.g. every 30 milliseconds, the decoder takes a list of tokens that was created during the last frame. Token scores from those prior tokens on the list are checked to determine whether the token scores lie within a beam width. If so, the decoder creates new token scores based on the topology of the WFST for the current frame. The beam width is chosen so that the number of tokens being processed at the same time is not more than a maximum number of tokens that can be handled for real-time operation while providing a sufficient amount of accuracy.

The computational load of the decoder is even more problematic because the amount of compute used is not constant. Usually, short bursts of high computational demand exist at the start of utterances (such as sentences, phrases, words, or sounds) followed by stages of relatively low compute requirements. Specifically, the generic Viterbi search algorithm usually generates compute peaks and memory transaction floods near the beginning of the utterances because the decoder typically generates token scores for a much larger number of tokens in frames near the beginning of the utterances than at the end of the utterances. This occurs especially at the beginning of sentences because no additional context exists from which a language model can narrow a search space. This causes the computational peak in the utterance at a frame nearer the beginning of the utterance. The computation peaks may require five times or more compute and/or bandwidth to process a frame at a fixed time period compared to the average compute load for the whole utterance. To run ASR in real-time without significant delays, then, the processor must be able to process those compute bursts, which requires a higher base cost for a sufficient amount of hardware to handle more computations and more energy required to perform the processing. This phenomenon requires a developer to allocate a much larger amount of resources than that needed by the average computational load for ASR in order to achieve accurate real time speech recognition.

A number of conventional strategies attempt to limit or reduce the total computational load of ASR processing at the decoder, but these strategies do not specifically address the computational peak while decoding an utterance. For example, histogram pruning is used to reduce the beam width of the decoder once a frame is through processing and to set the beam width for the next frame. As token scores are computed for a frame, the token scores are added to a token list (or pool) which is then counted in a beam width histogram that counts the number of occurrences of each token score value. A beam width is the maximum number of tokens represented by states and that can exist on the transducer at any one instance in time. The beam width is usually fixed at some number of tokens that the computing device can handle processing at the same time (or within a relatively short time) to maintain real time ASR and may be set depending on a desired word error rate (WER) and real time factor (RTF) that is a common metric of the processing speed or performance of the ASR. By one form, RTF may be computed by dividing the time needed for processing an utterance by the duration of the utterance.

The tokens with the N best scores and that is the fixed number of tokens forming the beam width may be processed. The beam width is stated as being set at the maximum (or worst) token score that still makes the beam width token count. Once all token scores of a frame are obtained, the token scores are counted, and the beam width may be set for the next frame. When too many tokens are generated in the current frame, those tokens with the lowest scores are dropped to meet the token limit of the beam width for the next frame. The computations (and power consumption to perform the computations) performed for these dropped tokens in the current frame is an unnecessary waste of resources that is avoided by the decoding method described below. While the target number of tokens to form the beam width may be predetermined and fixed, the maximum token score of the beam width may vary, which in turn may vary the token scores and the number of tokens actually placed on the decoder for a next frame, as described in detail below.

In order to further reduce the computational load, tighter pruning parameters could be used that reduces the total number of tokens permitted. This is an additional limitation on the beam width separate from the usual token counting limit. Using tighter pruning, however, not only reduces compute but also lowers the recognition accuracy. Generally, the larger the beam width, the more accurate the speech recognition but the slower the processing. This lowered accuracy leads to a worse user experience.

Another way to reduce the computational load during decoding is to compare token scores to a threshold. In this case, the token is compared a number of times as the token score changes while propagating through the decoder, and compared to a heuristically defined token score threshold. This results in removing some tokens based on its token score without changing the beam width of the frame. This was performed, rather than change the beam width, because this threshold was added for a different reason. This technique tracked which token scores were dropped and their values thereby concentrating on the effects on the current frame. In contrast, the present methods concentrate on which token scores should contribute to the beam width histogram and therefore concentrate on the effect on future frames. These optimizations slightly improve performance, but do not change the processing flow significantly. Thus, it was not possible to avoid the increased compute peak demands with these conventional methods.

To avoid these disadvantages and extend the battery life on devices using ASR, ASR methods presented herein increase ASR performance and reduce the computational load of the ASR engine. This is accomplished by updating the beam width itself multiple individual times during the decoding of a single frame (by one example, this may be referred to as inner frame histogram pruning or inner frame beam width updating). This beam width updating may be performed each time a token score is added to the token list or at some other desired interval. In this case, the beam width may be reduced multiple times during the processing of the single frame. This inner frame histogram pruning results in the significant reduction of the computational spike since tokens can be eliminated as soon as a token score of the token is not within the updated beam width rather than computing multiple token scores for a token within a frame and then having the token dropped at the end of the frame anyway for not fitting within a beam width updated only at the end of the frame.

The inner frame histogram pruning reduces the variability of compute needed during token passing at the decoder, thereby enabling continuous large vocabulary speech recognition, and in turn, real time large vocabulary ASR on many devices including low-power embedded devices with reduced compute, memory bandwidth and power consumption requirements. It also lowers the average resource usage and provides better accuracy compared to a conventional system.

Referring now to FIG. 1, an environment-sensitive automatic speech recognition system 10 may be a speech enabled human machine interface (HMI). While system 10 may be, or may have, any device that processes audio and has sufficient memory, processors, and power for ASR such as smartphones, smartwatches, smart glasses, smart exercise wrist-bands, smart speakers, and so forth as well as vehicle applications or other applications that have ASR. On such devices, power consumption usually is a critical factor making highly efficient speech recognition implementations necessary. Here, the ASR system 10 may have an audio capture or receiving device 14, such as a microphone for example, to receive sound waves from a user 12, and that converts the waves into a raw electrical acoustical signal that may be recorded in a memory. The system 10 may have an analog front end 16 that provides analog pre-processing and signal conditioning as well as an analog/digital (A/D) converter to provide a digital acoustic signal to an acoustic front-end unit 18. Alternatively, the microphone unit may be digital and connected directly through a two wire digital interface such as a pulse density modulation (PDM) interface. In this case, a digital signal is directly fed to the acoustic front end 18. The acoustic front-end unit 18 may perform pre-processing which may include signal conditioning, noise cancelling, sampling rate conversion, signal equalization, and/or pre-emphasis filtration to flatten the signal. The acoustic front-end unit 18 also may divide the acoustic signal into frames, by 10 ms or 30 ms frames by some examples. The pre-processed digital signal then may be provided to a feature extraction unit 19 which may or may not be part of an ASR engine or unit 20. The feature extraction unit 19 may perform, or may be linked to, a voice activity detection unit (not shown) that performs voice activation detection (VAD) to identify the endpoints of utterances as well as linear prediction, Mel-cepstrum, and/or additives such as energy measures, and delta and acceleration coefficients, and other processing operations such as weight functions, feature vector stacking and transformations, dimensionality reduction and normalization. The feature extraction unit 19 also extracts acoustic features or feature vectors from the acoustic signal using Fourier transforms and so forth to identify phonemes provided in the signal. An acoustic scoring unit 22, which also may or may not be considered part of the ASR engine 20, then uses acoustic models to determine a probability score for the context dependent phonemes that are to be identified.

A decoder 23 uses the acoustic scores to identify utterance hypotheses and compute their scores. The decoder 23 uses calculations that may be represented as a network (or graph or lattice) that may be referred to as a weighted finite state transducer (WFST) as mentioned above. The WFST has arcs (or edges) and states (at nodes) interconnected by the arcs. The arcs are arrows that extend from state-to-state on the WFST and show a direction of flow or propagation. Additionally, the WFST decoder 23 may dynamically create a word or word sequence hypothesis, which may be in the form of a word lattice that provides confidence measures, and in some cases, multiple word lattices that provide alternative results. The WFST decoder 23 forms a WFST that may be determinized, minimized, weight or label pushed, or otherwise transformed (e.g. by sorting the arcs by weight, input or output symbol) in any order before being used for decoding. The WFST may be a deterministic or a non-deterministic finite state transducer that may contain epsilon arcs. The WFST may have one or more initial states, and may be statically or dynamically composed from a lexicon WFST (L) and a language model or a grammar WFST (G). Alternatively, the WFST may have lexicon WFST (L) which may be implemented as a tree without an additional grammar or language model, or the WFST may be statically or dynamically composed with a context sensitivity WFST (C), or with a Hidden Markov Model (HMM) WFST (H) that may have HMM transitions, HMM state IDs, Gaussian Mixture Model (GMM) densities, or deep neural networks (DNNs) output state IDs as input symbols. After propagation, the WFST may contain one or more final states that may have individual weights. The decoder 23 uses known specific rules, construction, operation, and properties for single-best speech decoding, and the details of these that are not relevant here are not explained further in order to provide a clear description of the arrangement of the new features described herein.

A hypothetical word sequence or word lattice may be formed by the WFST decoder by using a token generation unit 32 and a propagation unit 34. These units 32 and 34 use the acoustic scores and token passing algorithms to form utterance hypotheses. A single token represents one hypothesis of a spoken utterance and represents the words that were spoken according to that hypothesis. During decoding, the token generation unit 32 generates or obtains the values of the tokens and places several tokens in the states of the WFST, each of them representing a different possible utterance that may have been spoken up to that point in time. At the beginning of decoding, a single token is placed in a start state of the WFST. During discrete points in time (so called frames), the propagation unit 34 transmits each token along, or propagates along, the arcs of the WFST computing token scores for a token as it propagates. If a WFST state has more than one outgoing arc, the token is duplicated, creating one token for each destination state. If the token is passed along an arc in the WFST that has a non-epsilon output symbol (i.e., the output is not empty, so that there is a word hypothesis attached to the arc), the output symbol may be used to form a word sequence hypothesis or word lattice. In a single-best decoding environment, it is sufficient to only consider the best token in each state of the WFST. If more than one token is propagated into the same state, recombination occurs where all but one of those tokens are removed from the active search space so that several different utterance hypotheses are recombined into a single one. In some forms, the output symbols from the WFST may be collected, depending on the type of WFST, during or after the token propagation to form one most likely word lattice or alternative word lattices.

Specifically, each transducer has the beam width mentioned above and a current token buffer size or list 42 on a buffer 40 that can be modified depending on the SNR and to select a suitable tradeoff between WER and RTF. The beam width parameter is related to the breadth-first search for the best sentence hypothesis which is a part of the speech recognition process. In each time instance, a limited number of best search states are kept. The larger the beam width, the more states are retained. In other words, and as mentioned above, the beam width is the maximum number of tokens represented by states and that can exist on the transducer at any one instance in time. This may be controlled by limiting the size of the current token buffer, which matches the size of the beam width, and holds the current states of the tokens propagating through the WFST.

Another parameter of the WFST is the transition weights of the arcs which can be modified to emphasize or de-emphasize a certain relevant sub-vocabulary part of a total available vocabulary for more accurate speech recognition.

As to the beam width updating according to the methods herein, and as mentioned above, inner frame beam width updating is performed by updating a beam width histogram, performed by a histogram unit 36, and each time a token score is generated at the decoder by the propagation unit 34. Once the histogram is adjusted, a beam width control unit 38 determines the beam width by determining or counting the token scores that is the current beam width (or beam capacity) from the best score to the worst score. Whichever score is the last score that forms the beam becomes the maximum (or worst) token score and sets the beam width. For example, when the beam width permits 1000 tokens, say this includes scores 0 to 16 on the histogram, and the token score 16 is set as the current beam width. Those tokens with token scores over 16 are dis-continued on the decoder nodes and propagation ends for those tokens. This occurs for individual or each time a token score is computed during the processing of a single same frame rather than waiting for the end of the frame, which significantly lowers the computational load needed to handle the tokens because the relatively constant adjustment of the beam width significantly and relatively quickly lowers the numbers of token scores that need to be computed and/or handled. This also may occur regardless of the order that nodes (or states) on the decoder, and in turn, tokens are being handled for the single frame. Other details are provided below.

The output word lattice or lattices (or other form of output hypothetical phrases, sounds, sentence, or sentences) are made available to a language interpreter and execution unit (or interpretation engine) 24 to determine the user intent. This intent determination or spoken utterance classification may be based on decision trees, form filling algorithms or statistical classification (e.g. using support-vector networks (SVNs) or deep neural networks (DNNs)).

Once the user intent is determined for an utterance, the interpretation engine 24 also may output a response or initiate an action. The response may be in audio form through a speaker component 26, or in visual form as text on a display component 28 for example. Otherwise, an action may be initiated to control another end device 30 (whether or not considered as part of, or within, the same device as the speech recognition system 10). For example, a user may ask the personal assistant to look up an actor's movies using keywords on a search engine. The end device 30 may simply be software instead of a physical device or hardware or any combination thereof, and is not particularly limited to anything except to have the ability to understand a command or request resulting from a speech recognition determination and to perform or initiate an action in light of that command or request.

Referring to FIG. 2, an example process 200 for a computer-implemented method of speech recognition with efficient decoding is provided. In the illustrated implementation, process 200 may include one or more operations, functions or actions as illustrated by one or more of operations 202 to 212 numbered evenly. By way of non-limiting example, process 200 may be described herein with reference to any of example speech recognition devices 10, 800, 900, or 110 of FIGS. 1 and 8-10, and where relevant.

Process 200 may include "obtain audio data including human speech divided into frames" 202, and particularly, an audio recording or live streaming data from one or more microphones for example. The dividing of the audio signal into frames, such as 10 ms or 30 ms frames, is already described above. This operation also may include the feature extraction and acoustic scoring of phonemes so that the frames referred to here have acoustic scores ready to be input to a decoder.

Process 200 may include "propagate tokens of the frames through a speech recognition decoder" 204. Initially, this operation may include populating the arcs and nodes with arc weights and destination state acoustic scores respectively, and for the first frame. Tokens are established at each input node of the decoder with a token score set at a default value such as an acoustic score of a first phoneme or other default value. Thereafter the propagation on the decoder, the token scores of the output nodes on the decoder and for a completed previous frame are now set as the input token scores on the decoder for the next frame. This is repeated for all frames until the end of the utterance.

This operation also may include "for individual frames, update a decoder beam width after a current token score of one of the frames is computed and before a subsequent token score of the same one frame is compared to an updated beam width" 206, "wherein subsequent is relative to a time the current token score is computed" 208, and "wherein the updating is repeated for multiple current token scores of the one frame" 210. Thus, after a current token score is computed, it is compared to a current beam width that is a threshold token score permitted in the beam. If the current token score is not within the beam width, the token is dis-continued at this point (or node or destination state) and no further computations are performed for this token from the state being analyzed. If the current token score is within the beam width, the token score is added to a token list (or token pool) and a beam width histogram is updated. Then, by one form, before the current token score can be used as the source state token score to compute a new next token score, the beam width is updated by using the just-updated beam width histogram. In this way, the beam width may be updated when each token score is computed and added to the token list, and each time the beam width histogram is updated. By other forms, the determination as to whether or not to update the beam width could be set at some fixed or variable interval of token score counts such as every 10 or 100 token scores, or may be set at a certain time interval, such as every 1 ms, and this may be used whether or not the beam width histogram is being updated for every token score. There may be some balancing algorithm to set when the beam width is updated so that the beam width updating itself does not unnecessarily add computational load.

Otherwise, the beam width may be updated from token score to token score of the frame regardless of which token a token score is associated with. Thus, the decoder does not necessarily compute token scores token by token. By one example, the decoder may compute token scores by state position from start end to finish end regardless of state positions of a particular token. Also, the beam width updating may be initiated after a predetermined minimum number of token scores are added to a token list. Thus, at the very start of the decoding, the decoder may not have a sufficient number of token scores yet such that the inner frame histogram pruning is not yet worth performing and the frequent beam width updating itself will be too costly in computational load. It also follows that the inner frame beam width updating could be stopped when the number of token scores on the token list falls below the minimum threshold during processing of a frame. The details of how the beam width is updated are described below with process 300.

Process 200 may include "determine one or more hypothesis sounds, words, or phrases depending on the token scores" 212. Once the token scores are computed, the token scores are collected or otherwise summed or combined to compute probabilities for output symbols in order to form utterance hypotheses. The hypotheses then may be provided to a language model unit for a final determination of the spoken language.

Figure 3B:
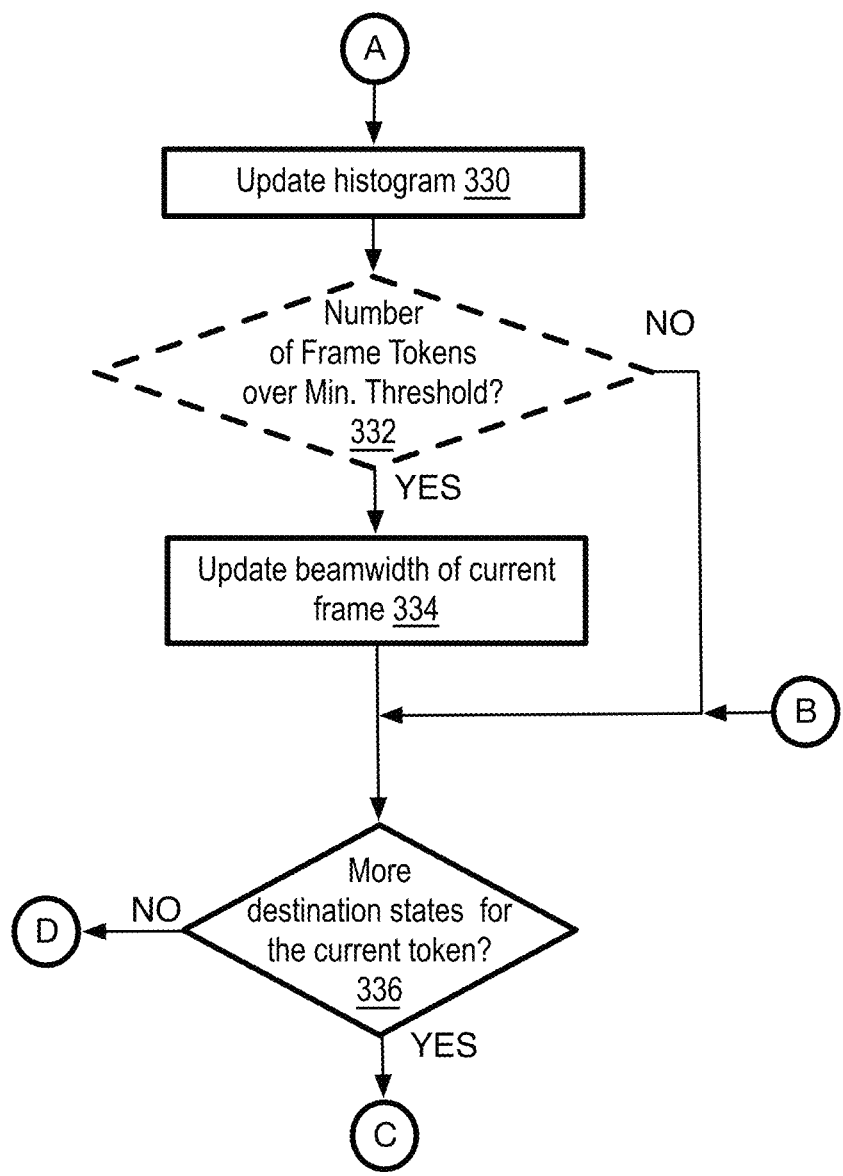

Referring to FIGS. 3A-3B, an example process 300 for a computer-implemented method of speech recognition with efficient decoding is provided. In the illustrated implementation, process 300 may include one or more operations, functions or actions as illustrated by one or more of operations 302 to 336 generally numbered evenly. By way of non-limiting example, process 300 may be described herein with reference to any of example speech recognition devices 10, 800, 900, or 1000 of FIGS. 1, and 8-10 respectively, and where relevant.

Process 300 may include "obtain frame of audio data" 302. This may include reading audio input including human speech from acoustic signals captured by one or more microphones. The audio may be previously recorded or may be a live stream of audio data. This operation may include cleaned or pre-processed audio data that is ready for ASR computations as described above, and specifically generating 10 or 30 ms, or other duration, frames of acoustic scores ready for input to a decoder.

The decoder may be a WFST or other lattice-type transducer, or any other type of language model that uses acoustic scores and/or permits the selection of the language model as described herein. By one approach, the feature extraction and acoustic scoring occurs before the WFST decoding begins. By another example, the acoustic scoring may occur just in-time. If scoring is performed just in time, it may be performed on demand, such that only acoustic scores that are needed during WFST decoding are computed as described herein.

The core token passing algorithm used by such a WFST may include deriving an acoustic score for the arc that the token is traveling, which may include adding the old (prior) score plus arc (or transition) weight plus acoustic score of a destination state. As mentioned above, this may include the use of a lexicon, a statistical language model or a grammar and phoneme context dependency and HMM state topology information. The generated WFST resource may be a single, statically composed WFST or two or more WFSTs to be used with dynamic composition.

Figure 4:
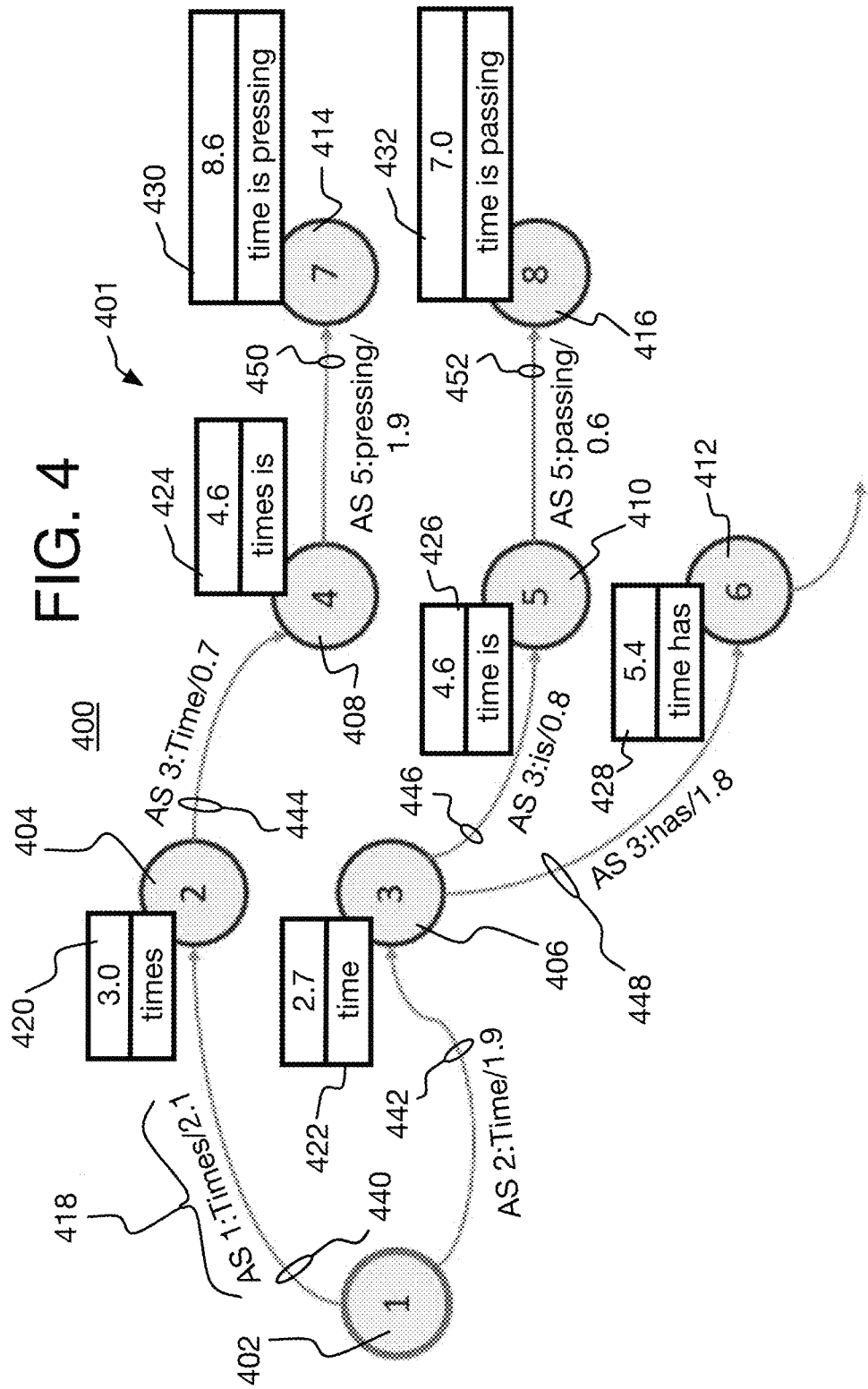
FIG. 4 is a schematic diagram of an ASR decoder network structure according to at least one of the implementations herein.

Referring to FIG. 4, an example decoder 400 has a propagation structure or network 401 and is provided for reference to explain process 300. The decoder 400 has states or nodes 1 to 8 (numbered 402 to 416 evenly) and arcs 440 to 452 numbered evenly that show propagation direction of the tokens from state to state. For example, arc 440 shows the propagation direction from state 1 (402) to state 2 (404). Each arc 440 to 452 has an input label 418 that includes an acoustic score ID (AS 1 for arc 440), an output label ("Times"), and a language model (LM) weight (here 2.1 for the example of arc 440). The other arcs are shown with similar input labels. States 2 to 8 (404 to 416) are also each shown with a token or token box 420 to 432 numbered evenly and respectively. Each token includes a cost of reaching the state (the top section of the token box) and the hypothesis (the bottom section of the token box). The last tokens 430 and 432 at states 7 and 8 respectively show the full hypothesis outputs (time is pressing or time is passing).

In operation, a token with a default start token score as a source score is placed at state 1 402. The token is then propagated to both states 2 and 3 in parallel by computing a new token score for states 2 and 3 by using the arc weights and the destination acoustic score at the states 2 and 3. This is repeated for each move to a new state.

The decoder may be loaded for a certain frame, and then reloaded with weights and acoustic scores for the next frame. For example, as shown below on the acoustic score tables, the acoustic scores for frames at time 0, 1, and 2 all may be different. The example continues below with the operations of beam width updating in light of this structure.

| Acoustic Scores for Time $t_0$ | | Acoustic Scores for Time $t_1$ | | Acoustic Scores for Time $t_2$ | |
|---|---|---|---|---|---|
| AS 1 | 0.9 | AS 1 | 3.9 | AS 1 | 4.0 |
| AS 2 | 0.8 | AS 2 | 4.8 | AS 2 | 4.5 |

| Acoustic Scores for Time $t_0$ | | Acoustic Scores for Time $t_1$ | | Acoustic Scores for Time $t_2$ | |
|---|---|---|---|---|---|
| AS 3 | 1.1 | AS 3 | 0.9 | AS 3 | 3.9 |
| AS 4 | 3.2 | AS 4 | 4.2 | AS 4 | 6.2 |
| AS 5 | 4.1 | AS 5 | 4.1 | AS 5 | 2.1 |
| AS 6 | 8.1 | AS 6 | 8.1 | AS 6 | 1.8 |

Figure 5:
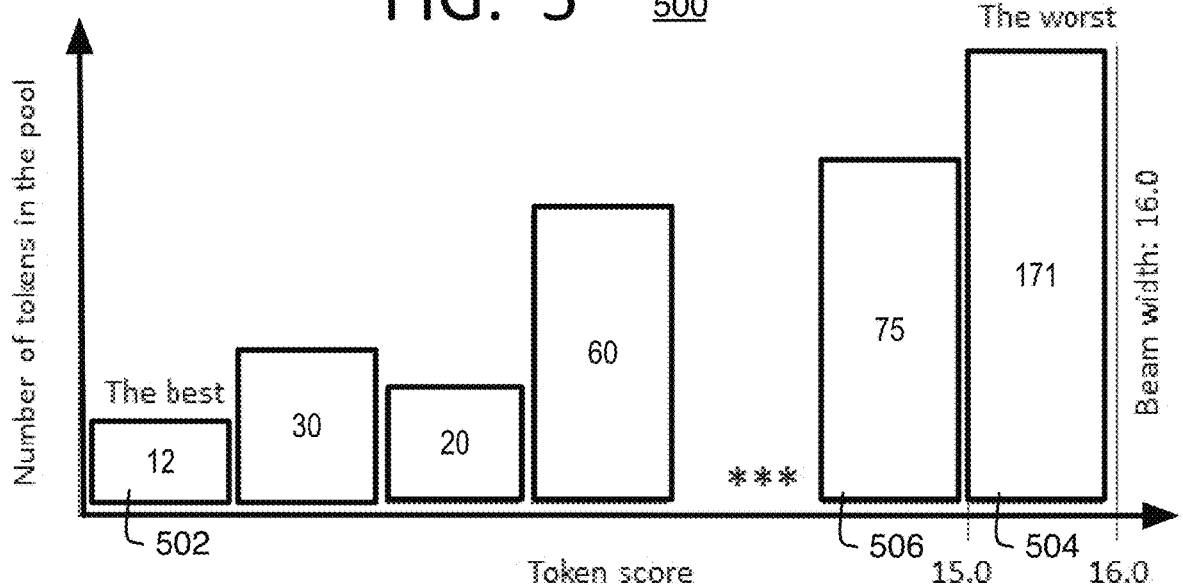
FIG. 5 is a chart of an example beam width histogram of a decoder before a new token is added according to at least one of the implementations herein.

Process 300 may include "reset score histogram" 304. When the decoder is ready to begin a new frame, a beam width histogram is reset and any token score count in the histogram is removed. Referring to FIG. 5, for example, a beam width histogram 500 has token scores along the bottom axis and token score count along the vertical axis. Each or individual times a token score is computed for the decoder, the token score is counted so that there is a count of how many token scores have the same token score on the histogram. For example, there are 6 columns or bins shown for six different token scores of all token scores on the histogram 500, and listed from best score to worst score. There are 12 token scores (502) with the same best score and 171 token scores (504) with the same worst score (here being a score of 16.0). The current beam width is then referred to as the worst token score that fits in the beam, here being the 16.0. The beam width is updated by determining which of the columns (or bins) fit into a target number (or maximum assumed token count) of token scores fixed for the beam (such as 1000 by one example). As the token scores are counted, this can change the beam width value (the worst token score value), which in turn can change the number of tokens actually permitted in the beam width, even when the target number of token scores is fixed, because the number of token scores actually permitted in the beam width changes by moving an entire column (or bin) in or out of the beam width rather than individual token scores on the histogram.

Thus, in this example, beam width histogram 500 may show a beam width of 16.0 and may draw from a token pool with a capacity for up to 10000 token scores (all scores used on the decoder which remain until the end of the frame). The maximum assumed token count (or target token score capacity) is 1000 here where there are currently 1000 token scores in the pool. More detail of the operation of the histogram 500 is explained for inner frame beam width updating below.

Process 300 may include "set initial beam width" 306. The initial beam width for frame start may be a predetermined default value but is otherwise the last beam width from the prior frame. By one form, this may be the beam width from the inner frame beam width updating but could also be from the conventional beam width update between frames when such is being employed up to this point for example.

Process 300 may include "obtain previous frame (pf) token from token list of previous frame" 308. This operation may be ignored when the first frame is being processed, but otherwise a previous token list or previous token score may have a list of all token scores on the decoder for a single previous frame.

Figure 6:
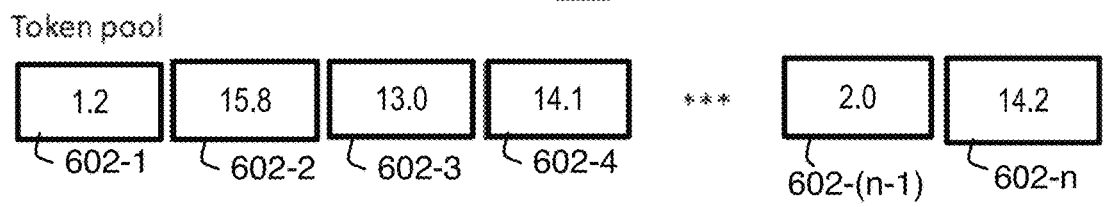
FIG. 6 is a schematic diagram of an example token pool according to at least one of the implementations herein.

Referring to FIG. 6, an example token list or pool 600 (which is the current token list) is shown with four different scores shown and numbered 601-1 to 602-n. For this example, n may be 1000.

Process 300 may include the inquiry "pf token score within beam width of previous frame?" 310. Here, the pf token score is compared to the last beam width of the previous frame relative to a current frame being processed. Alternatively, other beam widths associated with the prior frame could be used, such as the beam width used to approve the pf token score in the first place, or formed directly after the generation of the pf token score if the inner frame beam width updating was used on the previous frame. If the pf token score is not within the beam width, the process 300 may include the inquiry "more pf tokens on the pf token list?" 312. If there are more tokens, the process loops back to operation 308 to obtain the next previous token score on the previous frame. If no more pf tokens exist, then process 300 may include the inquiry "more frames?" 313. When the last frame is being processed, then process 300 ends. When more frames are yet to be analyzed representing the input audio signal, then the process loop back to operation 302 to obtain the data of the audio frame.

With this arrangement, two beam width comparisons are made for a current token score. One comparison based on a previous frame (pf) token score and a previous beam width. If the pf token is not within a beam width from the previous frame, then the token is dropped thereby avoiding the computation of any new token scores based on this token, thereby saving a tremendous among of compute load and wasted energy in the aggregate. When the pf token score is within the previous beam width, then the new token score is computed. But even then, the beam width is not updated unless a new current token score is within the latest beam width of the current frame.

Thus, process 300 proceeds so that when the pf token score is within the last beam width of the previous frame, then process 300 may include "on current frame, set source state "s" of token in the decoder" 314. This may be any node on the decoder. This may be, for example, setting state 1 (402) of decoder 400 (FIG. 4) as the source state, and by one form, where the source state value is the token score of the pf token score. Other alternatives are contemplated.

Process 300 may include "set destination state "d" of source state "s" in the decoder" 316. Here, the destination state is determined, such as state 2 (402 on FIG. 4) as the destination state. The process 300 then may include "generate current token score" 318 and by having process 300 include "obtain arc weight" 320, such as the LM values on decoder 400, and may include "obtain destination acoustic score" 322, such as 0.8 from the time=0 acoustic score table at AS 2 recited above. Next, process 300 may include "compute current token using pf token score, weight, and acoustic score of destination" 324, where typically (and generally) the three values are summed, multiplied, or otherwise combined to form a new current token score of state 2 (404).

Process 300 may include the inquiry "current token score (subsequent to last current token score) within updated beam width of current frame?" 326. The current token score is then compared to the latest beam width. Each new token score is referred to as a current token score compared to the subsequent token score, when it exists.

Process 300 may include "place current token in current frame (cf) token list" 328, and this refers to placing the token score in the list or pool 600 (FIG. 6) for example.

Figure 7:
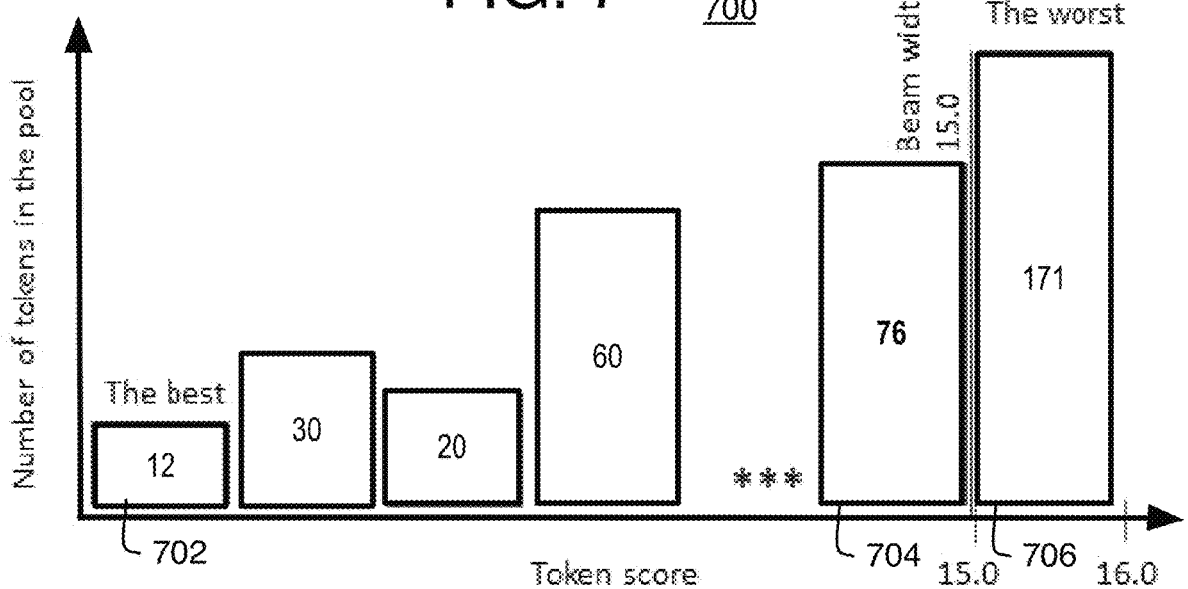
FIG. 7 is a chart of an example beam width histogram of a decoder after a token is added according to at least one of the implementations herein.

Referring to FIGS. 5-7, process 300 may include "update histogram" 330. Histogram 500 shows a "before updating" condition of the histogram as described above, while histogram 700 is an "after updating" condition of the same histogram. Particularly, as recalled from above, histogram 500 shows a beam width 16.0 with 1000 token scores, and where column 504 is the token scores of 16.0 (171 of them), and column 506 is the token scores of 15.0 (75 of them). In this condition, the last column of token scores at 16.0 adds the last 171 token scores up to, or less than, 1000 token scores total in the beam width. Say the current token score to be added is 15.0, which is then added to the second column (or bin) 506 from the right and that becomes the second column 704 from the right on the histogram 700 now with a count of 76 token scores of 15.0.

Process 300 optionally may include the inquiry "number of frame tokens over min. threshold?" 332. This operation is included so that some required minimum number of token scores must be generated before the inner frame beam width updating is initiated for this option. The updating does not start until the minimum threshold, or some other criteria is reached, such as time from the start of the frame. Otherwise, the updating could be arranged to start from the first token score, although this may be too inefficient. When the number of token scores are too low, then the process 300 skips the inner frame beam width updating and continues with operation 336.

When a sufficient number of token scores exist, process 300 may include "update beam width of current frame" 334. Now with the additional token score at the second column 704, say that there are now 1001 token scores in the beam width, which is one too many. Thus, the beam width must be adjusted. However, rather than adjusting by one token score at a time, the entire column (or bin) of worst scores 16.0 (706) is removed from the beam width, and the beam width is set at 15.0. Since the entire column 706 is removed from the beam width, the current beam width only has (1000−171+1) 830 token scores, significantly reducing the number of tokens that still need to be propagated forward, thereby reducing the computational load and energy consumption. Such a rise and fall of the number of token scores in the beam width may at least partly depend on the structure of the decoder, where multiple destination states may extend from single source states in different and varying patterns for example.

While the first beam width comparison at the previous frame (operation 310) avoids unnecessary token score computations on the current frame and those moving forward, the beam width comparison and updating on the current frame avoids even more unnecessary token score computations going forward from the current frame while also reducing the total number of token scores by the updating of the beam width itself.

Process 300 may include the inquiry "more destination states for the current token?" 336. When more destination states exist, such as state 3 (406) on decoder 400, then the process 300 loops back to operation 316 to compute the next current token score for the same token already started and processed at state 1 as described above. Otherwise, when no more destination states exist for the current token, then the process 300 loops back to operation 312 to determine if there are more previous frame tokens on the previous frame token list, and the process continues as described above. Alternatively, it will be appreciated that the process 300 could continue in different ways rather than checking all destination nodes for a source state first. While the order should be chosen for best performance, the operations for updating the beam width after each or multiple individual token score generation during a single frame itself need not be limited to a specific token order when not desired. Thus, the order could be based on decoder structure instead emphasizing order of layers of states (or nodes) rather than token to token.

It will be understood that updating by inner frame histogram pruning that provides beam width updating during processing of a single frame may extend at least from a generation of a first token score of the frame on the decoder until the end of processing that uses a last-computed token score of the single frame. The end of processing of the last-computed token score may comprise comparing the last-computed token score to a latest updated beam width, whether or not that is considered the exact end of processing of the single frame, and whether or not the beam width is actually updated.

Also, the decoder still may perform a separate beam width updating between the processing of frames in addition to the inner frame beam width updates performed during the processing of the one frame, when such is desired.

It will be appreciated that processes 200 and 300 may be provided by sample ASR systems 100, 800, 900, and/or 1000 to operate at least some implementations of the present disclosure. It will be appreciated that one or more operations of processes 200 and/or 300 may be omitted or performed in a different order than that recited herein.

Results

To analyze the results of testing, ASR performance indicators like word error rate (WER) and real time factor (RTF) for example can vary significantly depending on the environment at or around the device capturing the audio that forms ambient noise characteristics as well as speaker variations and different parameters of the ASR itself. WER is a common metric of the accuracy of an ASR. It may be computed as the relative number of recognition errors in the ASR's output given the number of spoken words. Falsely inserted words, deleted words, or substitution of one spoken word by another are counted as recognition errors.

The computational load in the form of average and peak "Million Cycles per Second" (MCPS) requirements of the disclosed method were compared to that of the current best solution that represents the conventional decoders. Note that while the present method decreased the average compute requirements, the improvements are most noticeable in the peak MCPS requirements. Those peak MCPS requirements represent the processing power a system needs for decoding to run in real-time. The results are shown on the following Tables 1 and 2.

TABLE 1

| Compute Comparison | Conventional | Disclosed Method |
|---|---|---|
| Average MCPS | 152 | 59 |
| Peak MCPS | 613 | 150 |

Because the algorithm changes the considered hypotheses, the tests also evaluated whether the disclosed present method has a negative impact on word error rate (WER):

TABLE 2

| Error Comparison (Lower is Better) | Conventional | Disclosed Method |
|---|---|---|
| WER on test set A | 10.3% | 10.0% |
| WER on test set B | 13.6% | 13.4% |

As can be seen from Table 2, the disclosed method slightly improves accuracy as well. Thus, the disclosed method reduces the required compute power of the target device while delivering a same or even slightly better user experience.

In addition, any one or more of the operations of the processes of FIGS. 2-3 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 8:
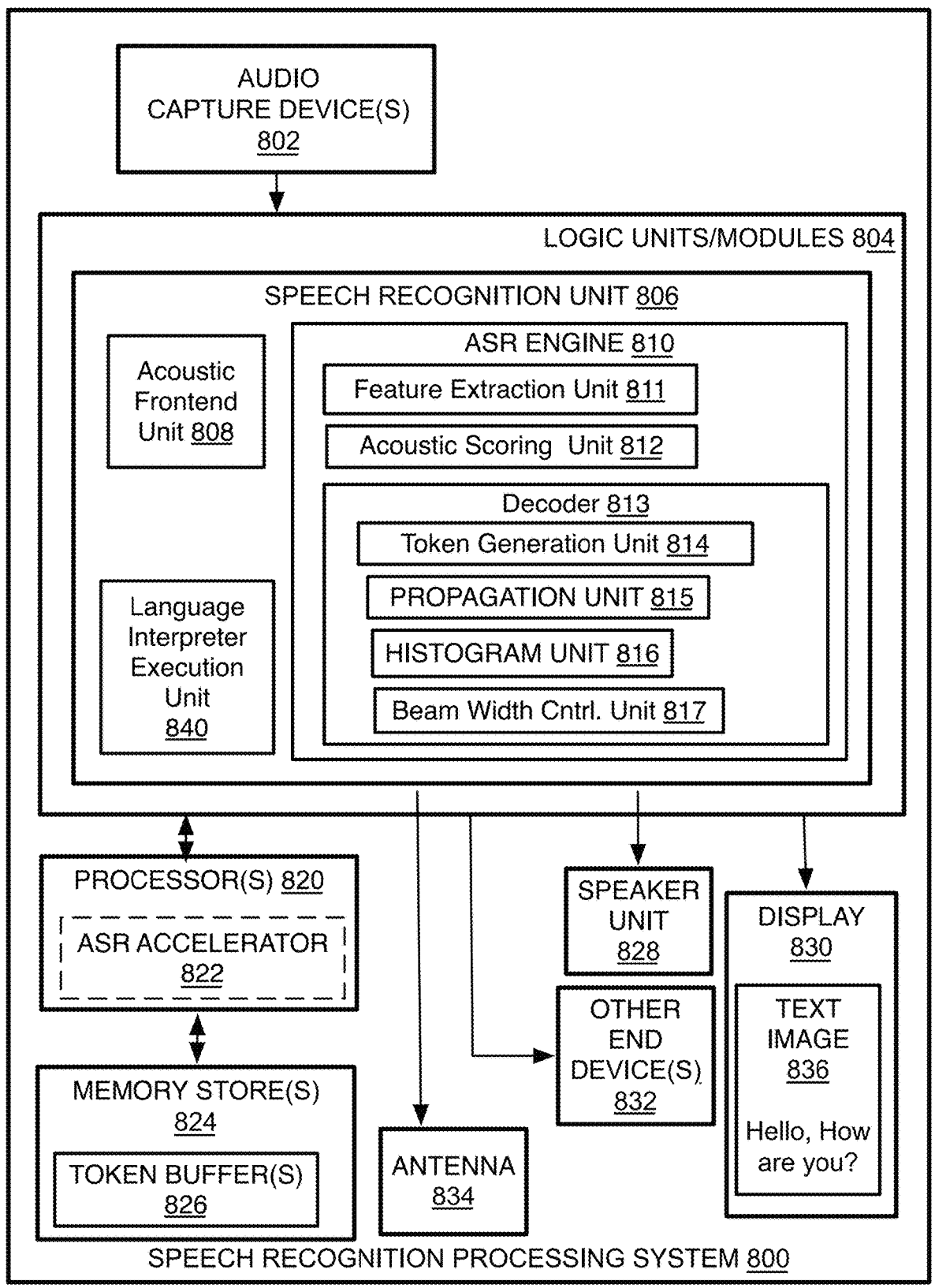
FIG. 8 is an illustrative diagram of an example system.

Referring to FIG. 8, an example speech recognition system 800 is arranged in accordance with at least some implementations of the present disclosure. In various implementations, the example speech recognition processing system 800 may have an audio capture device(s) 802 to form or receive acoustical signal data. This can be implemented in various ways. Thus, in one form, the speech recognition processing system 800 may be an audio capture device such as a microphone, and audio capture device 802, in this case, may be the microphone hardware and sensor software, module, or component. In other examples, speech recognition processing system 800 may have an audio capture device 802 that includes or may be a microphone, and logic modules 804 may communicate remotely with, or otherwise may be communicatively coupled to, the audio capture device 802 for further processing of the acoustic data.

In either case, such technology may include a wearable device such as smartphone, wrist computer such as a smartwatch or an exercise wrist-band, or smart glasses, but otherwise a telephone, a dictation machine, other sound recording machine, a mobile device or an on-board device, or any combination of these. The speech recognition system used herein enables ASR on small-scale CPUs (wearables, smartphones) since the present systems and methods do not necessarily require connecting to a cloud or server, for example, to perform the ASR as described herein.

Thus, in one form, audio capture device 802 may include audio capture hardware including one or more audio sensors as well as actuator controls. These controls may be part of an audio signal sensor module or component for operating the audio signal sensor. The audio signal sensor component may be part of the audio capture device 802, or may be part of the logical modules 804 or both. Such audio signal sensor component can be used to convert sound waves into an electrical acoustic signal. The audio capture device 802 also may have an A/D converter, other filters, and so forth to provide a digital signal for speech recognition processing.

In the illustrated example, the logic modules 804 may include an acoustic front-end unit 808 that provides pre-processing as described with unit 18 (FIG. 1) and that identifies acoustic features, and an ASR engine or unit 810. The ASR engine 810 may include a feature extraction unit 811, an acoustic scoring unit 812 that provides acoustic scores for the acoustic features, and a decoder 813 that may be a WFST decoder and that provides a word sequence hypothesis, which may be in the form of a language or word transducer and/or lattice understood and as described herein. The decoder unit 813 may include a token generation unit 814, a propagation unit 815, a histogram unit 816, and a beam width control unit 817, all of which are similar to those similarly named units of the device 100 of FIG. 1 and may perform the same inner frame beam width updating tasks as that already described above for those units. A language interpreter execution unit 840 may be provided that determines the user intent and reacts accordingly.

The decoder unit 813 may be operated by, or even entirely or partially located at, processor(s) 820, and which may include, or connect to, an accelerator 822 to perform ASR engine computations. The logic modules 804 may be communicatively coupled to the components of the audio capture device 802 in order to receive raw acoustic data and sensor data. The logic modules 804 may or may not be considered to be part of the audio capture device.

The speech recognition processing system 800 may have one or more processors 820 which may include the accelerator 822, which may be a dedicated accelerator, and one such as the Intel Atom, memory stores 824 which may or may not hold the token buffers 826 as well as word histories, phoneme, vocabulary and/or context databases, and so forth, at least one speaker unit 828 to provide auditory responses to the input acoustic signals, one or more displays 830 to provide images 836 of text or other content as a visual response to the acoustic signals, other end device(s) 832 to perform actions in response to the acoustic signal, and antenna 834. In one example implementation, the speech recognition system 800 may have the display 830, at least one processor 820 communicatively coupled to the display, at least one memory 824 communicatively coupled to the processor and having a token buffer 826 by one example for storing the tokens as explained above. The antenna 834 may be provided for transmission of relevant commands to other devices that may act upon the user input. Otherwise, the results of the speech recognition process may be stored in memory 824. As illustrated, any of these components may be capable of communication with one another and/or communication with portions of logic modules 804 and/or audio capture device 802. Thus, processors 820 may be communicatively coupled to both the audio capture device 802 and the logic modules 804 for operating those components. By one approach, although speech recognition system 800, as shown in FIG. 8, may include one particular set of blocks or actions associated with particular components or modules, these blocks or actions may be associated with different components or modules than the particular component or module illustrated here.

As another alternative, it will be understood that speech recognition system 800, or the other systems described herein (such as system 900), may be a server, or may be part of a server-based system or network rather than a mobile system. Thus, system 800, in the form of a server, may not have, or may not be directly connected to, the mobile elements such as the antenna, but may still have the same components of the speech recognition unit 806 and provide speech recognition services over a computer or telecommunications network for example. Likewise, platform 902 of system 900 below may be a server platform instead. Using the disclosed speech recognition unit on server platforms may save energy and provide better performance.

Figure 9:
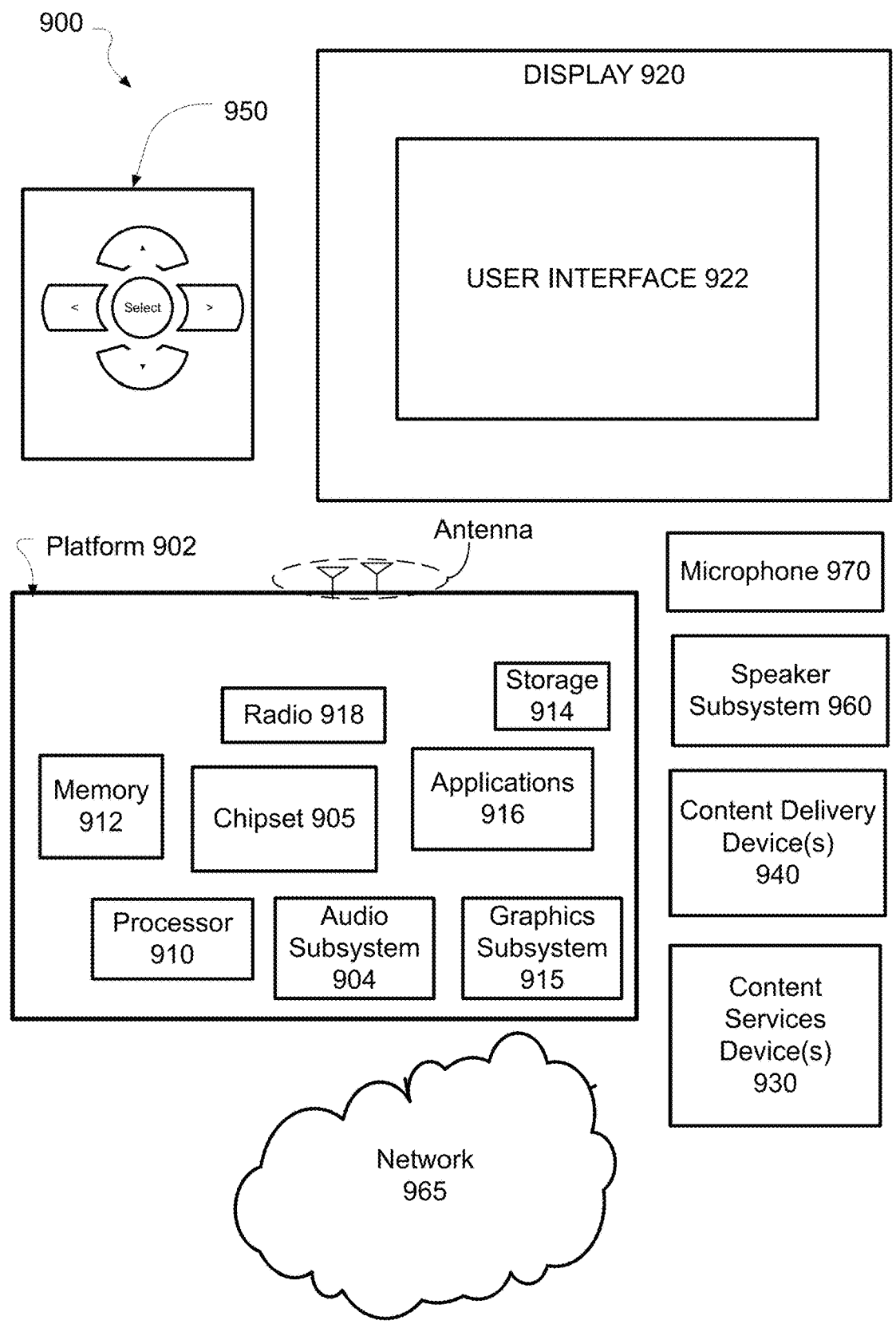
FIG. 9 is an illustrative diagram of another example system.

Referring to FIG. 9, an example system 900 in accordance with the present disclosure operates one or more aspects of the speech recognition system described herein. It will be understood from the nature of the system components described below that such components may be associated with, or used to operate, certain part or parts of the speech recognition system described above. In various implementations, system 900 may be a media system although system 900 is not limited to this context. For example, system 900 may be incorporated into a wearable device such as a smart watch, smart glasses, or exercise wrist-band, microphone, personal computer (PC), laptop computer, ultra-laptop computer, tablet, touch pad, portable computer, handheld computer, palmtop computer, personal digital assistant (PDA), cellular telephone, combination cellular telephone/PDA, television, other smart device (e.g., smartphone, smart tablet or smart television), mobile internet device (MID), messaging device, data communication device, and so forth.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902, at least one speaker or speaker subsystem 960, at least one microphone 970, and/or display 920. Each of these components is described in greater detail below.

In various implementations, platform 902 may include any combination of a chipset 905, processor 910, memory 912, storage 914, audio subsystem 904, graphics subsystem 915, applications 916 and/or radio 918. Chipset 905 may provide intercommunication among processor 910, memory 912, storage 914, audio subsystem 904, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device, or any other available storage. In various implementations, storage 914 may include technology to increase the storage performance enhanced protection for valuable digital media when multiple hard drives are included, for example.

Audio subsystem 904 may perform processing of audio such as environment-sensitive automatic speech recognition as described herein and/or voice recognition and other audio-related tasks. The audio subsystem 904 may comprise one or more processing units and accelerators. Such an audio subsystem may be integrated into processor 910 or chipset 905. In some implementations, the audio subsystem 904 may be a stand-alone card communicatively coupled to chipset 905. An interface may be used to communicatively couple the audio subsystem 904 to at least one speaker 960, at least one microphone 970, and/or display 920.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, Display Port, wireless HDMI, and/or wireless HD compliant techniques. Graphics subsystem 915 may be integrated into processor 910 or chipset 905. In some implementations, graphics subsystem 915 may be a stand-alone card communicatively coupled to chipset 905.

The audio processing techniques described herein may be implemented in various hardware architectures. For example, audio functionality may be integrated within a chipset. Alternatively, a discrete audio processor may be used. As still another implementation, the audio functions may be provided by a general purpose processor, including a multi-core processor. In further implementations, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920, speaker subsystem 960, and microphone 970. Platform 902 and/or content services device(s) 930 may be coupled to a network 965 to communicate (e.g., send and/or receive) media information to and from network 965. Content delivery device(s) 940 also may be coupled to platform 902, speaker subsystem 960, microphone 970, and/or to display 920.

In various implementations, content services device(s) 930 may include a microphone, a cable television box, personal computer, network, telephone, Internet enabled devices or appliance capable of delivering digital information and/or content, and any other similar device capable of unidirectionally or bidirectionally communicating content between content providers and platform 902 and speaker subsystem 960, microphone 970, and/or display 920, via network 965 or directly. It will be appreciated that the content may be communicated unidirectionally and/or bidirectionally to and from any one of the components in system 900 and a content provider via network 965. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of controller 950 may be used to interact with user interface 922, for example. In implementations, navigation controller 950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures. The audio subsystem 904 also may be used to control the motion of articles or selection of commands on the interface 922.

Movements of the navigation features of controller 950 may be replicated on a display (e.g., display 920) by movements of a pointer, cursor, focus ring, or other visual indicators displayed on the display or by audio commands. For example, under the control of software applications 916, the navigation features located on navigation controller 950 may be mapped to virtual navigation features displayed on user interface 922, for example. In implementations, controller 950 may not be a separate component but may be integrated into platform 902, speaker subsystem 960, microphone 970, and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example, or by auditory command. Program logic may allow platform 902 to stream content to media adaptors or other content services device(s) 930 or content delivery device(s) 940 even when the platform is turned "off." In addition, chipset 905 may include hardware and/or software support for 8.1 surround sound audio and/or high definition (7.1) surround sound audio, for example. Drivers may include an auditory or graphics driver for integrated auditory or graphics platforms. In implementations, the auditory or graphics driver may comprise a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various implementations, platform 902, speaker subsystem 960, microphone 970, and/or display 920 may be an integrated unit. Display 920, speaker subsystem 960, and/or microphone 970 and content service device(s) 930 may be integrated, or display 920, speaker subsystem 960, and/or microphone 970 and content delivery device(s) 940 may be integrated, for example. These examples are not meant to limit the present disclosure.

In various implementations, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information.

Media information may refer to any data representing content meant for a user. Examples of content may include, for example, data from a voice conversation, videoconference, streaming video and audio, electronic mail ("email") message, voice mail message, alphanumeric symbols, graphics, image, video, audio, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 9.

Figure 10:
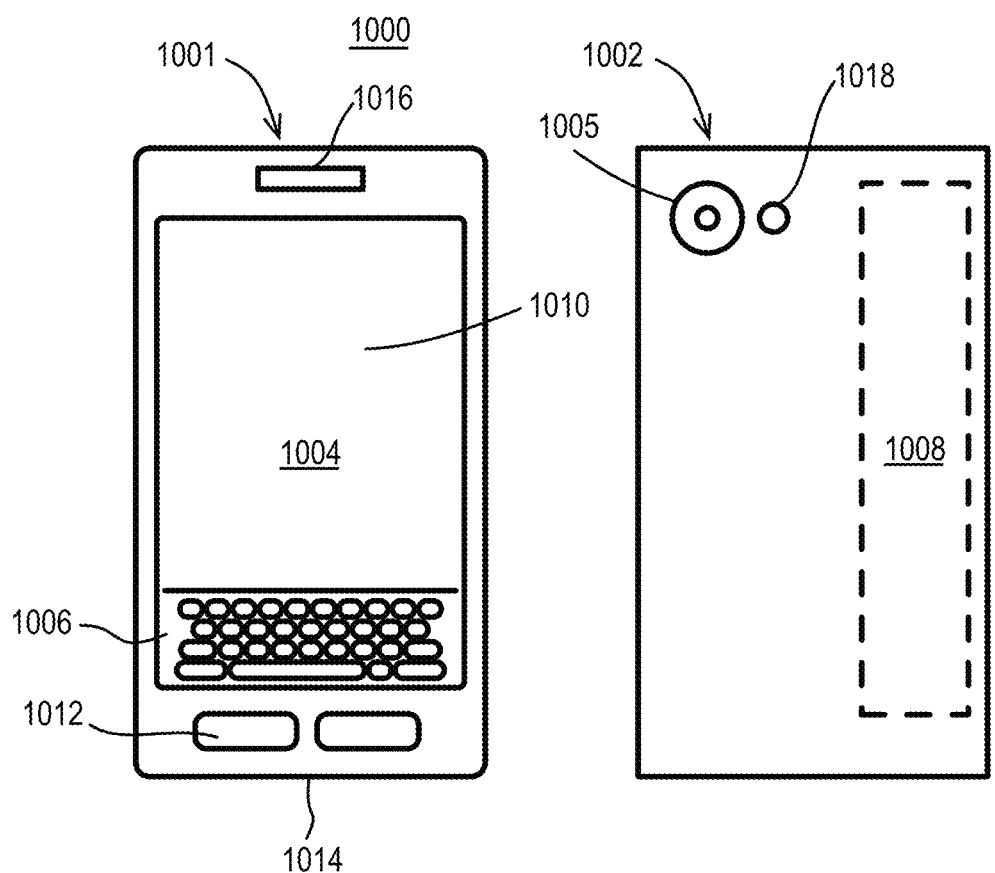
FIG. 10 illustrates another example device, all arranged in accordance with at least some implementations of the present disclosure.

Referring to FIG. 10, a small form factor device 1000 is one example of the varying physical styles or form factors in which system 800 or 900 may be embodied. By this approach, device 1000 may be implemented as a mobile computing device having wireless capabilities. A mobile computing device may refer to any device having a processing system and a mobile power source or supply, such as one or more batteries, for example.

As described above, examples of a mobile computing device may include any device with an audio sub-system such as a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, any other on-board (such as on a vehicle) computer, internet-of-things (IoT), specific purpose audio command system, and so forth, that may accept audio commands.

Examples of a mobile computing device also may include computers that are arranged to be worn by a person, such as a head-phone, head band, hearing aide, wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 10, device 1000 may include a housing with a front 1001 and a back 1002, a display 1004 including a screen 1010, an input/output (I/O) device 1006, and an antenna 1008. Device 1000 also may include navigation features 1012. Display 1004 may include any suitable display unit for displaying information appropriate for a mobile computing device. I/O device 1006 may include any suitable I/O device for entering information into a mobile computing device. Examples for I/O device 1006 may include an alphanumeric keyboard, a numeric keypad, a touch pad, input keys, buttons, switches, rocker switches, software and so forth. Information also may be entered into device 1000 by way of microphone 1014. Such information may be digitized by a speech recognition device as described herein as well as a voice recognition device, and as part of the device 1000, and may provide audio responses via a speaker 1016 or visual responses via screen 1004. The implementations are not limited in this context. The housing also may include a camera 1005 and an illuminator 1018.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

In a first implementation, a computer-implemented method of automatic speech recognition, comprises obtaining audio data including human speech divided into frames; propagating tokens of the frames through a speech recognition decoder comprising, for individual frames, updating a decoder beam width after a current token score of one of the frames is computed and before a subsequent token score of the same one frame is compared to an updated beam width, wherein subsequent is relative to a time the current token score is computed, and wherein the updating is repeated for multiple current token scores of the one frame; and determining one or more hypotheses sounds, words, or phrases depending on the token scores.

By one or more second implementations, and further to the first implementation, wherein the updating of the beam width occurs after each token score of a frame is generated and fits within a current beam width.

By one or more third implementations, and further to the first implementation, wherein the determination to update the beam width occurs at a uniform interval of a number of generated token scores By one or more fourth implementations, and further to any of the first to third implementations, wherein the beam width is updated from token score to token score of the frame regardless of which token a token score is associated with.

By one or more fifth implementations, and further to any of the first to fourth implementations, the method comprises setting a source node and a destination node among a plurality of nodes on the decoder; computing a current token score from the previous token score at the source node, an arc weight between the source and destination node, and an acoustic score at the destination node; comparing the current token score to a current beam width; and updating the beam width before the next token score is computed when the current token score is within the current beam width.

By one or more sixth implementations, and further to any of the first to fifth implementations, wherein the updating is initiated after a predetermined minimum number of token scores are added to a token list.

By one or more seventh implementations, and further to any of the first to fifth implementations, wherein the updating is initiated after a predetermined time is reached from a start of processing of a frame.

By one or more eighth implementations, and further to any of the first to seventh implementations, the method comprising updating a histogram with token scores when individual token scores are generated; and determining the updated beam width comprising using the histogram.

By one or more ninth implementations, and further to any of the first to eighth implementations, the method comprising updating the beam width each time the histogram is updated during processing of the one frame.

By an example tenth implementation, a computer-implemented system of automatic speech recognition, comprises an audio capture device; memory; and at least one processor communicatively coupled to the audio capture device and the memory, and being arranged to operate by: obtaining audio data including human speech divided into frames; propagating tokens of the frames through a speech recognition decoder comprising, for individual frames, updating a decoder beam width after a current token score of one of the frames is computed and before a subsequent token score of the same one frame is compared to an updated beam width, wherein subsequent is relative to a time the current token score is computed, and wherein the updating is repeated for multiple current token scores of the one frame; and determining one or more hypotheses sounds, words, or phrases depending on the token scores.

By one or more eleventh implementations, and further to the tenth implementation, wherein the updating occurs after each token score of a frame is determined and fits within a current beam width.

By one or more twelfth implementations, and further to any of the tenth or eleventh implementations, wherein the updating is inner frame histogram pruning that provides beam width updating during processing of a single frame extending at least from a generation of a first token score of the frame on the decoder until the end of processing that uses a last-computed token score of the single frame.

By one or more thirteenth implementations, and further to any of the tenth or eleventh implementations, wherein the updating is inner frame histogram pruning that provides beam width updating during processing of a single frame extending at least from a generation of a first token score of the frame on the decoder until the end of processing that uses a last-computed token score of the single frame, and wherein the end of processing of the last-computed token score comprises comparing the last-computed token score to a latest updated beam width.

By one or more fourteenth implementations, and further to any of the tenth to thirteenth implementations, wherein the at least one processor is arranged to perform beam width updating between the processing of frames in addition to the multiple beam width updates performed during the processing of the one frame.

By one or more fifteenth implementations, and further to any of the tenth to fourteenth implementations, wherein the updating is initiated after a predetermined minimum number of token scores are added to a token list.

By one or more sixteenth implementations, and further to any of the tenth to fifteenth implementations, wherein the updating is stopped when the number of token scores in the token list drops below a minimum threshold.

By one or more seventeenth implementations, and further to any of the tenth to sixteenth implementations, wherein updating of the beam width comprises only permitting the updating of the beam width at a current frame when a token score of a token of a previous frame is within a beam width of the previous frame.

By one or more eighteenth implementations, at least one non-transitory computer-readable medium having instructions that cause a computing device to operate by: obtaining audio data including human speech divided into frames; propagating tokens of the frames through a speech recognition decoder comprising, for individual frames, updating a decoder beam width after a current token score of one of the frames is computed and before a subsequent token score of the same one frame is compared to an updated beam width, wherein subsequent is relative to a time the current token score is computed, and wherein the updating is repeated for multiple current token scores of the one frame; and determining one or more hypotheses sounds, words, or phrases depending on the token scores.

By one or more nineteenth implementations, and further to the eighteenth implementation, wherein the updating occurs after each token score of a frame is determined and fits within a current beam width.

By one or more twentieth implementations, and further to the eighteenth implementation, wherein determining whether or not to update the beam width occurs at an interval of a number of generated token scores.

By one or more twenty-first implementations, and further to any of the eighteenth to twentieth implementations, wherein the beam width is updated from token score to token score of the frame regardless of which token a token score is associated with.

By one or more twenty-second implementations, and further to any of the eighteenth to twenty-first implementations, wherein the instructions cause the computing device to operate by: dropping a token with no further computation of token scores when a token score of a previous frame is not within the last beam width of the previous frame.

By one or more twenty-third implementations, and further to any of the eighteenth to twenty-first implementations, wherein the instructions cause the computing device to operate by: performing a beam width update when both a previous token score on a previous frame is within a beam width of the previous frame and a current token score associated with the previous token score is within a beam width of the current frame.

By one or more twenty-fourth implementations, and further to any of the eighteenth to twenty-first implementations, wherein the instructions cause the computing device to operate by: determining whether a source token score of a token on a previous frame is within a beam width of the previous frame; and when the source token score is within the beam width of the previous frame, determining whether a current token score of a current frame computed by using the source token score is within a beam width of the current frame; updating a beam width histogram when the current token score is within a beam width of the current frame; and updating the beam width of the current frame depending on the beam width histogram.

By one or more twenty-fifth implementations, and further to any of the eighteenth to twenty-fourth implementations, wherein the instructions cause the computing device to operate by updating a histogram with token scores when individual token scores are generated; and determining the updated beam width comprising using the histogram, wherein the updating of the beam width occurs each time the histogram is updated.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of automatic speech recognition, comprising:
   obtaining audio data including human speech divided into frames;
   propagating tokens of the frames through a speech recognition decoder comprising updating a decoder beam width multiple times during a run-time of one frame, and after individual token scores are computed in a sequence of token score computations; and
   determining one or more speech-related hypotheses depending on the token scores.

2. The method of claim 1 wherein the updating occurs between a time a current token score of one frame is computed and a time a subsequent token score subsequent to the time of the current token score is compared to an updated decoder beam width.

3. The method of claim 1 wherein the updating of the beam width occurs after each token score of a frame is generated and fits within a current beam width.

4. The method of claim 1 wherein the determination to update the beam width occurs at a uniform interval of a number of generated token scores.

5. The method of claim 1 wherein the beam width is updated from token score to token score of the frame regardless of which token a token score is associated with.

6. The method of claim 1 comprising:
   setting a source node and a destination node among a plurality of nodes on the decoder;
   computing a current token score from a previous token score at the source node, an arc weight between the source and destination node, and an acoustic score at the destination node;
   comparing the current token score to a current beam width; and
   updating the beam width before the next token score is computed when the current token score is within the current beam width.

7. The method of claim 1 wherein the updating is initiated at least one of: after a predetermined minimum number of token scores are added to a token list, and after a predetermined time is reached from a start of processing of a frame.

8. The method of claim 1 comprising updating a histogram with token scores when individual token scores are generated; and determining an updated beam width comprising using the histogram.

9. The method of claim 8 comprising updating the beam width each time the histogram is updated during processing of the one frame.

10. A computer-implemented automatic speech recognition device, comprising:
    memory storing audio data including human speech divided into frames; and
    circuitry forming at least one processor communicatively coupled to the memory, and being arranged to operate by:
      propagating tokens of the frames through a speech recognition decoder comprising updating a decoder beam width between a time a current token score of one frame is computed and a time a subsequent token score subsequent to the time of the current token score is compared to an updated decoder beam width; and wherein the updating is repeated for multiple current token scores of the one frame; and
      determining one or more speech-related hypotheses depending on the token scores.

11. The device of claim 10 wherein the updating occurs after each token score of a frame is determined and fits within a current beam width.

12. The device of claim 10 wherein the updating is inner frame histogram pruning that provides beam width updating during processing of a single frame extending at least from a generation of a first token score of the frame on the decoder until an end of processing that uses a last-computed token score of the single frame.

13. The device of claim 12 wherein the end of processing of the last-computed token score comprises comparing the last-computed token score to a latest updated beam width.

14. The device of claim 10 wherein the at least one processor is arranged to perform beam width updating between the processing of frames in addition to multiple beam width updates performed during the processing of the one frame.

15. The device of claim 10 wherein the updating is initiated after a predetermined minimum number of token scores are added to a token list.

16. The device of claim 15 wherein the updating is stopped when a number of token scores in the token list drops below a minimum threshold.

17. The device of claim 10 wherein updating of the beam width comprises only permitting the updating of the beam width at a current frame when a token score of a token of a previous frame is within a beam width of the previous frame.

18. At least one non-transitory computer-readable medium having instructions that cause a computing device to operate by:
  obtaining audio data including human speech divided into frames;
  propagating tokens of the frames through a speech recognition decoder comprising updating a decoder beam width between a time a current token score of one frame is computed and a time a subsequent token score of the one frame subsequent to the time of the current token score is compared to an updated decoder beam width; and wherein the updating is repeated for multiple current token scores of the one frame; and
  determining one or more speech-related hypotheses depending on the token scores.

19. The medium of claim 18 wherein the updating occurs after each token score of a frame is determined and fits within a current beam width.

20. The medium of claim 18 wherein determining whether or not to update the beam width occurs at an interval of a number of generated token scores.

21. The medium of claim 18 wherein the beam width is updated from token score to token score of the frame regardless of which token a token score is associated with.

22. The medium of claim 18 wherein the instructions cause the computing device to operate by:
  dropping a token with no further computation of token scores when a token score of a previous frame is not within the last beam width of the previous frame.

23. The medium of claim 18 wherein the instructions cause the computing device to operate by:
  performing a beam width update when both a previous token score on a previous frame is within a beam width of the previous frame and a current token score associated with the previous token score is within a beam width of a current frame.

24. The medium of claim 18 wherein the instructions cause the computing device to operate by:
  determining whether a source token score of a token on a previous frame is within a beam width of the previous frame; and
  when the source token score is within the beam width of the previous frame, determining whether a current token score of a current frame computed by using the source token score is within a beam width of the current frame;
  updating a beam width histogram when the current token score is within a beam width of the current frame; and
  updating the beam width of the current frame depending on the beam width histogram.

25. The medium of claim 18 wherein the instructions cause the computing device to operate by updating a histogram with token scores when individual token scores are generated; and determining the updated beam width comprising using the histogram, wherein the updating of the beam width occurs each time the histogram is updated.

* * * * *